(12) United States Patent
Sugita

(10) Patent No.: US 12,063,189 B2
(45) Date of Patent: Aug. 13, 2024

(54) SYSTEM, IMAGE PROCESSING APPARATUS IN COMMUNICATION WITH INFORMATION PROCESSING APPARATUS THAT PROVIDES A CHAT SERVICE, AND METHOD FOR CONTROLLING THE SAME

(71) Applicant: CANON KABUSHIKI KAISHA, Tokyo (JP)

(72) Inventor: Hikaru Sugita, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/817,612

(22) Filed: Aug. 4, 2022

(65) Prior Publication Data
US 2023/0052122 A1 Feb. 16, 2023

(30) Foreign Application Priority Data
Aug. 11, 2021 (JP) ................ 2021-131092

(51) Int. Cl.
*H04L 51/046* (2022.01)
*H04L 51/07* (2022.01)
*H04L 51/08* (2022.01)
*H04L 51/10* (2022.01)
*H04L 51/224* (2022.01)
*H04N 1/00* (2006.01)

(52) U.S. Cl.
CPC ............ *H04L 51/046* (2013.01); *H04L 51/07* (2022.05); *H04L 51/08* (2013.01); *H04L 51/10* (2013.01); *H04L 51/224* (2022.05); *H04N 1/00212* (2013.01); *H04N 1/00225* (2013.01)

(58) Field of Classification Search
None
See application file for complete search history.

(56) References Cited

U.S. PATENT DOCUMENTS

| | | | |
|---|---|---|---|
| 8,130,205 B2 * | 3/2012 | Forstall ............ | H04M 1/72436 345/173 |
| 9,596,382 B2 * | 3/2017 | Maeda ............... | H04N 1/00506 |
| 9,608,956 B2 * | 3/2017 | Sawato ................. | H04W 4/029 |
| 9,654,656 B2 * | 5/2017 | Akuzawa ........... | H04N 1/00424 |
| 9,888,209 B1 * | 2/2018 | Sato ..................... | G06F 3/0426 |
| 10,026,029 B2 * | 7/2018 | Sato ................... | H04N 1/00503 |

(Continued)

FOREIGN PATENT DOCUMENTS

JP 2021078084 A 5/2021

*Primary Examiner* — Backhean Tiv
(74) *Attorney, Agent, or Firm* — Canon U.S.A., Inc. IP Division

(57) ABSTRACT

A system includes an information processing apparatus that provides a chat service and an image processing apparatus. The information processing apparatus includes a receiving unit that receives a reading setting based on an instruction from a user and a transmission unit that transmits the received reading setting to the image processing apparatus. The image processing apparatus includes a reading unit that reads an image of a document and generates image data, a reception unit that receives the transmitted reading setting, a registration unit that registers an object associated with the received reading setting, a display unit that displays the registered object, and a control unit that, based on satisfaction of a predetermined condition without the instruction from the user, controls the display unit not to display the object.

10 Claims, 12 Drawing Sheets

(56) References Cited

U.S. PATENT DOCUMENTS

| | | | |
|---|---|---|---|
| 10,062,018 B2 * | 8/2018 | Inoue | G06K 15/1823 |
| 11,132,154 B2 * | 9/2021 | Tomihisa | G06F 3/1204 |
| 11,350,000 B2 * | 5/2022 | Tsukada | H04N 1/00474 |
| 11,412,094 B2 * | 8/2022 | Tsukada | H04N 1/00217 |
| 11,509,779 B2 * | 11/2022 | Ushinohama | H04N 1/00212 |
| 2004/0119757 A1 * | 6/2004 | Corley | G06F 3/04817 |
| | | | 715/837 |
| 2009/0043857 A1 * | 2/2009 | Ferlitsch | G06F 3/1268 |
| | | | 709/206 |
| 2009/0231637 A1 * | 9/2009 | Kemmochi | H04N 1/00206 |
| | | | 358/474 |
| 2014/0033095 A1 * | 1/2014 | Koba | G06F 3/0488 |
| | | | 715/765 |
| 2014/0268230 A1 * | 9/2014 | Kosuda | G06F 3/1263 |
| | | | 358/1.15 |
| 2016/0156854 A1 * | 6/2016 | Yang | H04N 5/272 |
| | | | 348/239 |
| 2016/0162128 A1 * | 6/2016 | Hansen | G06F 9/445 |
| | | | 715/747 |
| 2017/0085731 A1 * | 3/2017 | Akuzawa | G06F 3/04847 |
| 2018/0136639 A1 * | 5/2018 | Sekimoto | G05B 19/425 |
| 2019/0369924 A1 * | 12/2019 | Oka | H04L 51/02 |
| 2021/0409556 A1 * | 12/2021 | Ushinohama | H04N 1/32128 |
| 2023/0052122 A1 * | 2/2023 | Sugita | H04L 51/08 |
| 2023/0066018 A1 * | 3/2023 | Ushinohama | H04N 1/32085 |
| 2023/0171471 A1 * | 6/2023 | Tsukada | G06Q 50/10 |
| | | | 709/204 |

* cited by examiner

FIG.7A
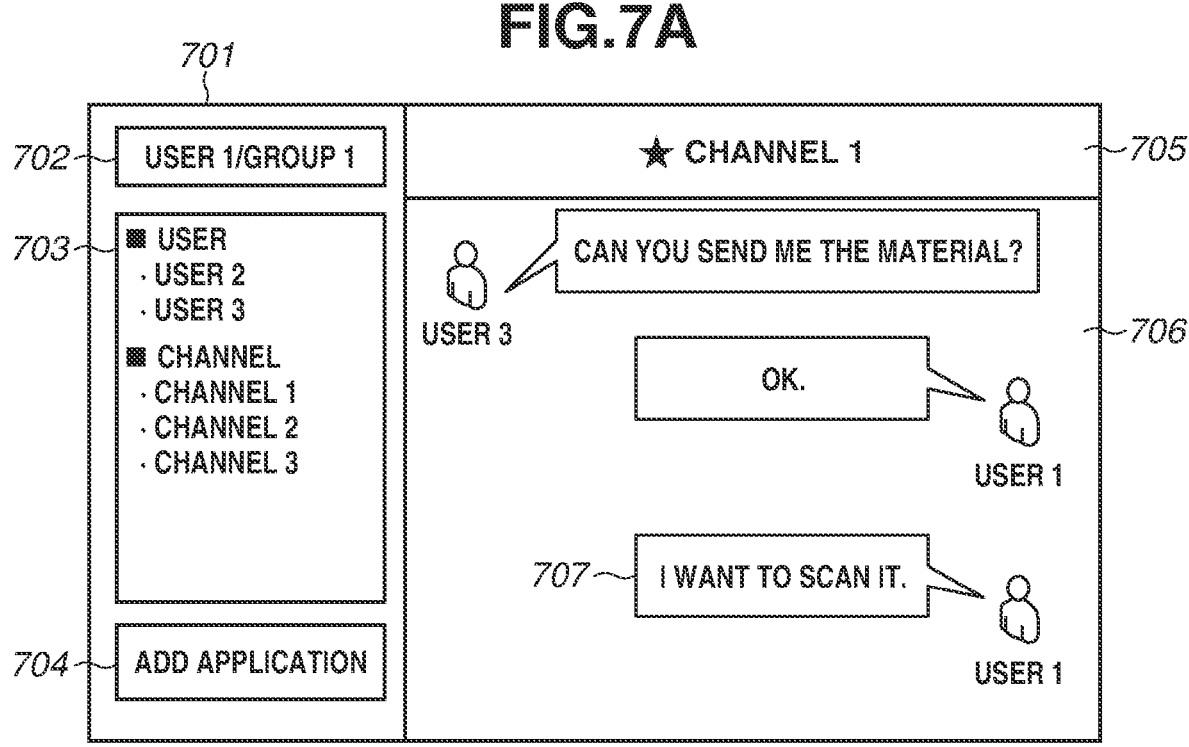
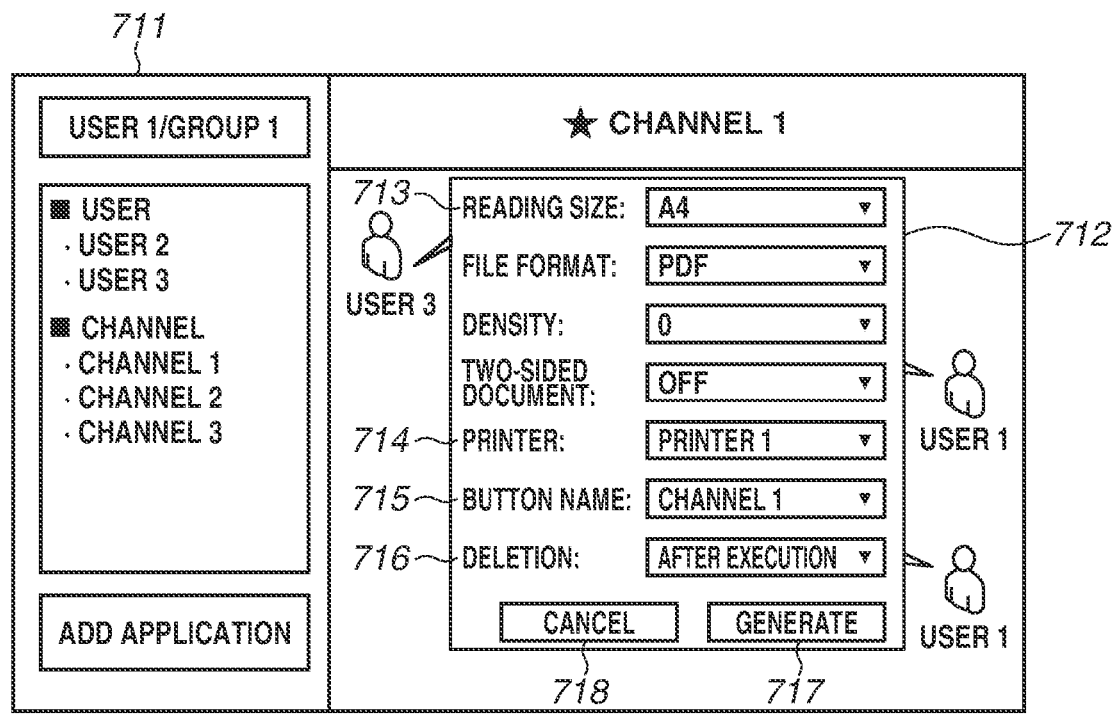

FIG.10

| BUTTON REGISTRATION INFORMATION | | |
|---|---|---|
| BUTTON NAME: | CHANNEL 1 | ~1001 |
| IMAGE TRANSMISSION DESTINATION: | http://fileupload.businesschat.com/rootfolder | ~1002 |
| CHAT TRANSMISSION DESTINATION: | http://hook.businesschat.com/channel1 | ~1003 |
| MENTION: | USER 1 | ~1004 |
| DELETION: | NUMBER OF TIMES OF EXECUTION: 1 | ~1005 |
| READING SIZE: | A4 | ~1006 |
| FILE FORMAT: | PDF | |
| DENSITY: | 0 | |
| TWO-SIDED DOCUMENT: | OFF | |

SYSTEM, IMAGE PROCESSING APPARATUS IN COMMUNICATION WITH INFORMATION PROCESSING APPARATUS THAT PROVIDES A CHAT SERVICE, AND METHOD FOR CONTROLLING THE SAME

BACKGROUND

Field

The present disclosure relates to a system, an image processing apparatus, and a method for controlling the same.

Description of the Related Art

Japanese Patent Application Laid-Open No. 2021-78084 discusses a technique in which an image processing apparatus scans an image of a document to generate image data and transmits the image data to a chat server that provides a chat service. Consequently, the image data is shared in a talk room of the chat service.

As discussed in Japanese Patent Application Laid-Open No. 2021-78084, in a case where an image processing apparatus scans an image of a document and transmits image data generated by scanning to a chat server, a user can set a scan setting or a transmission destination in a chat service. The chat server can then transmit a setting value to the image processing apparatus, and the image processing apparatus generates a button for performing scanning or transmission based on the received setting value.

The above-described approach can have a difficulty in that every time the scanning or transmission is performed based on a different setting value, a button needs to be generated. This can increase the number of buttons displayed on the screen, which can make it difficult for the user to find a desired button.

SUMMARY

Aspects of the present disclosure are directed to, in a case where a button corresponding to a setting value received from a chat server and registered is displayed, enhancing the ability of a user to select a desired button.

According to an aspect of the present disclosure, a system includes an information processing apparatus configured to provide a chat service, and an image processing apparatus, wherein the information processing apparatus includes a receiving unit configured to receive a reading setting based on an instruction from a user in a channel of the chat service, and a transmission unit configured to transmit the reading setting received by the receiving unit to the image processing apparatus, and wherein the image processing apparatus includes a reading unit configured to read an image of a document and generate image data, a reception unit configured to receive the reading setting transmitted from the transmission unit, a registration unit configured to register an object associated with the reading setting received by the reception unit, a display unit configured to display the object registered by the registration unit, and a control unit configured to, based on satisfaction of a predetermined condition without the instruction from the user, control the display unit not to display the object on a screen displayed by the display unit.

Further features will become apparent from the following description of exemplary embodiments with reference to the attached drawings.

BRIEF DESCRIPTION OF THE DRAWINGS

FIGS. 7A and 7B are diagrams illustrating examples of screens displayed on an operation panel of the user terminal by a message application.

FIG. 10 is a diagram illustrating an example of information registered in association with a button.

DESCRIPTION OF THE EMBODIMENTS

Exemplary embodiments will be described in detail below with reference to the drawings. The following exemplary embodiments are not seen to be limiting. Not all combinations of the described features are essential in implementing the exemplary embodiments.

An exemplary embodiment will now be described. As an example of an image processing apparatus according to the present exemplary embodiment, a multifunction peripheral (MFP) 10 having a print function, a scan function, and a fax function is described.

Figure 1:
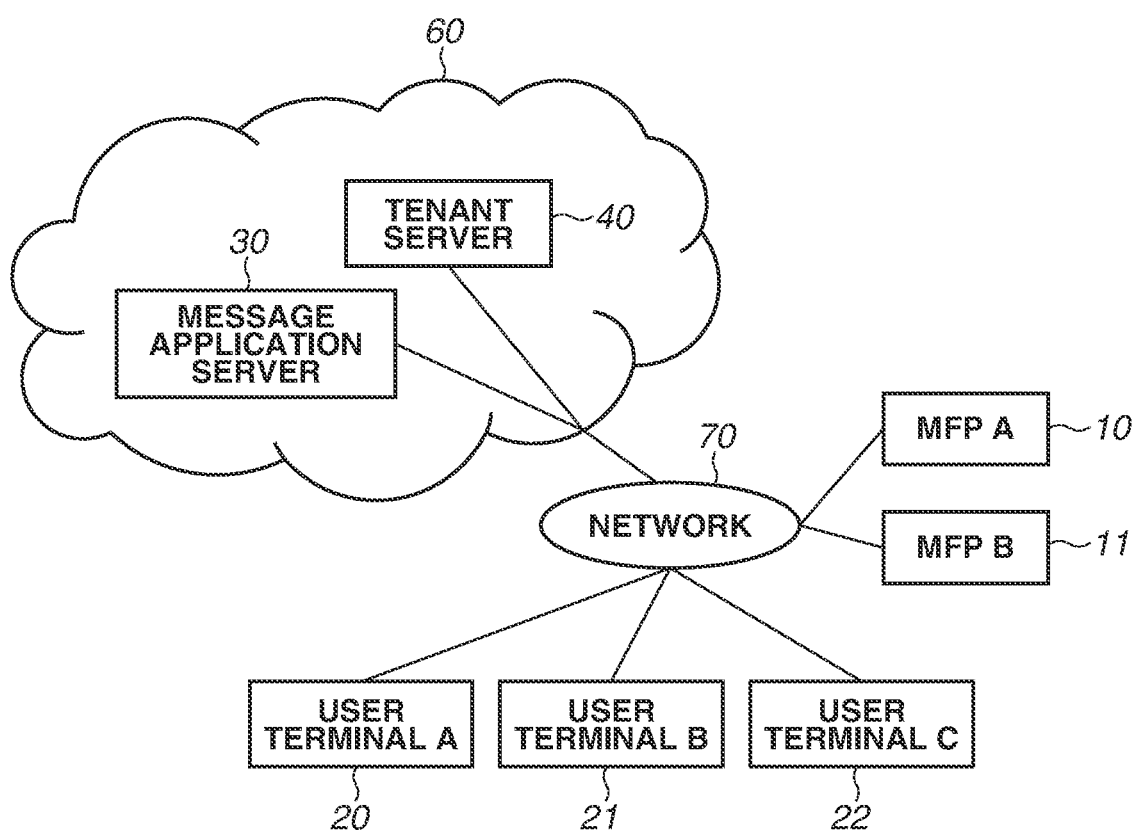
FIG. 1 is a diagram illustrating an example of an overall configuration of a message application service.

FIG. 1 is a diagram illustrating an example of an overall configuration of a message application service according to an exemplary embodiment. The message application service includes MFP A 10 and MFP B 11, which are image processing apparatuses, user terminals 20 to 22, a message application server 30, which is an example of an information processing apparatus, and a tenant server 40. These apparatuses are connected together via a network 70, enabling the devices to communicate with each other. The network 70 is a wireless or wired network composed of a wide area network (WAN) or a local area network (LAN).

Both the MFP A 10 and MFP B 11 include the function of printing an image that the MFP is notified of by the message application server 30, or the function of transmitting image data generated by reading a document to the message application server 30. Although FIG. 1 illustrates, as an example, a case where two MFPs indicated as the MFP A 10 and the MFP B 11 are connected, there can be any number of MFPs. Since the MFP A 10 and the MFP B 11 have the same configuration, only the MFP A 10 will be described below for description purposes. Since the user terminals 20 to 22 can have the same configuration, only the user terminal 20 will be described below for description purposes.

Each of the user terminals 20 to 22 represents an information terminal such as a smartphone, a tablet terminal, or a personal computer used by a user of the message application service. Although FIG. 1 illustrates, as an example, a case where three terminals indicated as the user terminals 20 to 22 are connected, there can be any number of terminals. The user operates any of the user terminals 20 to 22 to access the message application server 30 on a cloud. The user then exchanges messages with another user or executes an installed application.

As described above, the user terminals 20 to 22 and the message application server 30 are connected to the same wired or wireless communication network so that the user terminals 20 to 22 and the message application server 30 can transmit and receive data to and from each other. In the present exemplary embodiment, a public interface on the Internet is used as an example of the communication network. Alternatively, a private interface can be used.

The message application server 30 is a cloud server located in the cloud 60 and is an information processing apparatus that provides a service using a message application 306. The message application server 30 executes overall processing regarding an exchange of messages, such as processes of transmitting and receiving messages to and from the user terminals 20 to 22 and a process of displaying a display screen with regard to transmitting and receiving messages. A message exchange mechanism of the message application 306 will be described below with reference to FIG. 7.

The tenant server 40 is a cloud server located in the cloud 60 and is a server that saves and provides pieces of tenant information. Details of the tenant information stored in the tenant server 40 will be described below with reference to FIG. 6.

Figure 2:
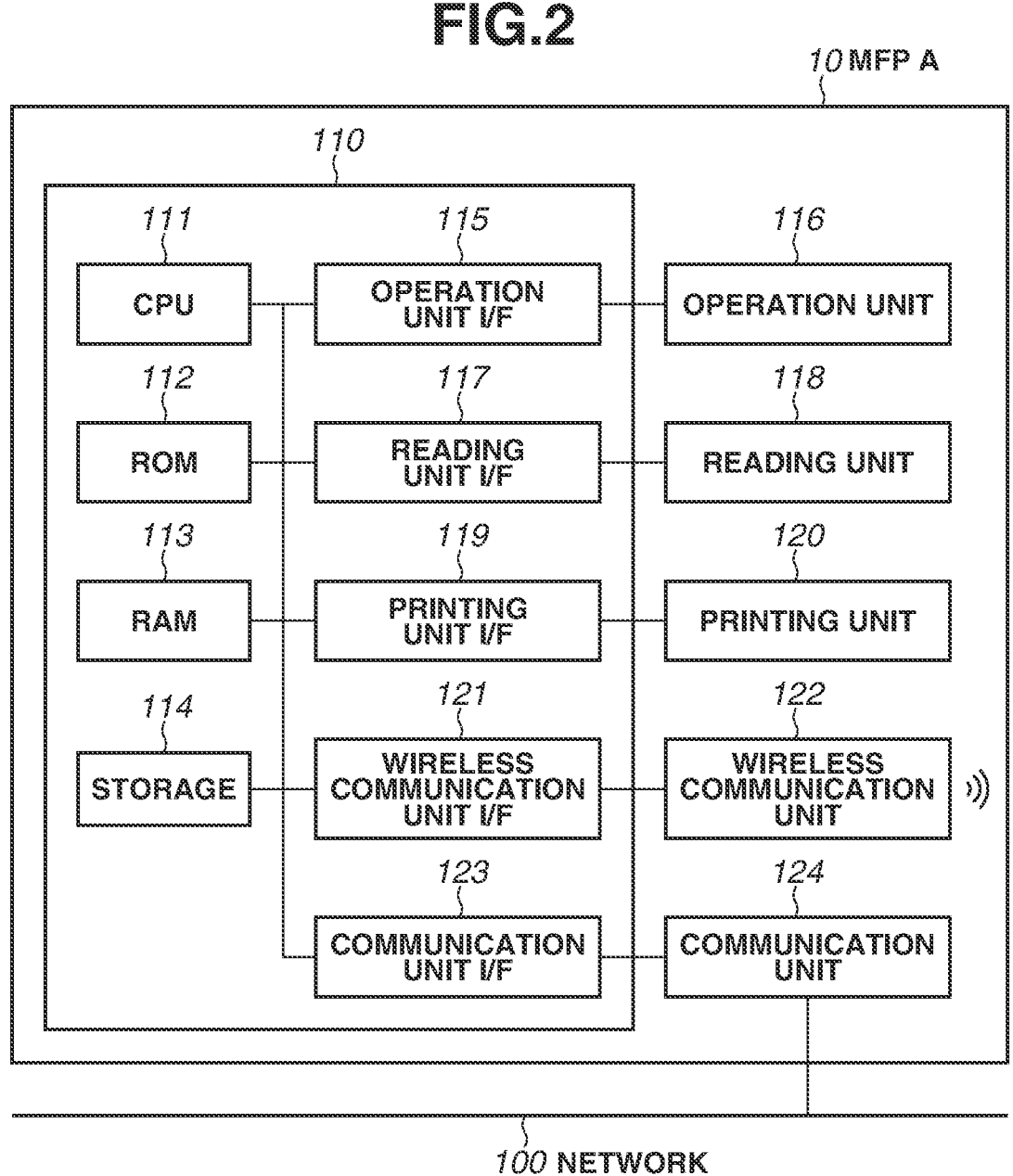
FIG. 2 is a diagram illustrating an example of a hardware configuration of a multifunction peripheral (MFP).

FIG. 2 is a diagram illustrating an example of a hardware configuration of the MFP A 10. A control unit 110 including a central processing unit (CPU) 111 controls operation of the MFP A 10. The CPU 111 loads control programs stored in a read-only memory (ROM) 112 or storage 114 into a random-access memory (RAM) 113 and performs various types of control such as reading control and print control. The ROM 112 stores control programs that can be executed by the CPU 111. The ROM 112 also stores a boot program and font data. The RAM 113 is a main storage memory and is used as a work area or a temporary storage area into which various control programs stored in the ROM 112 and the storage 114 are loaded. The storage 114 stores image data, print data, various programs, various addresses, and various pieces of setting information. Examples of a medium used as the storage 114 include auxiliary storage devices such as a solid-state drive (SSD) and a hard disk drive (HDD), and an embedded MultiMediaCard (eMMC).

In the MFP A 10 according to the present exemplary embodiment, a single CPU 111 executes processes described below using a single memory (the RAM 113). This configuration is not seen to be limiting. In another exemplary embodiment, for example, a plurality of CPUs, RAMs, ROMs, and storages can cooperate to execute the below-described processes. In another exemplary embodiment, some of the below-described processes can be executed using a hardware circuit such as an application-specific integrated circuit (ASIC) or a field-programmable gate array (FPGA).

An operation unit interface (I/F) 115 connects an operation unit 116 including a display unit such as a touch panel and a hardware key to the control unit 110. The operation unit 116 serves both as a display unit that displays information to the user and an operation unit that detects an input from the user.

A reading unit I/F 117 connects a reading unit 118 such as a scanner to the control unit 110. The reading unit 118 reads an image of a document, and the CPU 111 converts the read image into image data such as binary data. The image data generated based on the image read by the reading unit 118 is transmitted to an external apparatus or printed on a recording sheet.

A printing unit I/F 119 connects a printing unit 120 such as a printer to the control unit 110. The CPU 111 transfers image data (print data) stored in the RAM 113 to the printing unit 120 via the printing unit I/F 119. The printing unit 120 prints an image based on the transferred image data on a recording sheet fed from a sheet feeding cassette.

A wireless communication unit I/F 121 is an I/F for controlling a wireless communication unit 122 and wirelessly connects the control unit 110 with an external wireless device. A configuration can be employed in which each of the user terminals 20 to 22 is used as the external wireless device.

A communication unit I/F 123 connects the control unit 110 to a network 100. The control unit 110, via the communication unit I/F 123, enables a communication unit 124 to transmit image data and various pieces of information within the MFP A 10 to an external apparatus on the network 100 or receives print data and information on the network 100 from an information processing apparatus on the network 100.

As a transmission/reception method via the network 100, the transmission and the reception can be performed using an electronic mail (email), or a file can be transmitted using another protocol (e.g., File Transfer Protocol (FTP), Server Message Block (SMB), or Web Distributed Authoring and Versioning (WebDAV)). Image data and various pieces of setting data can also be transmitted and received via the network 100 via access from the user terminal 20 or the message application server 30 using Hypertext Transfer Protocol (HTTP) communication.

Figure 3:
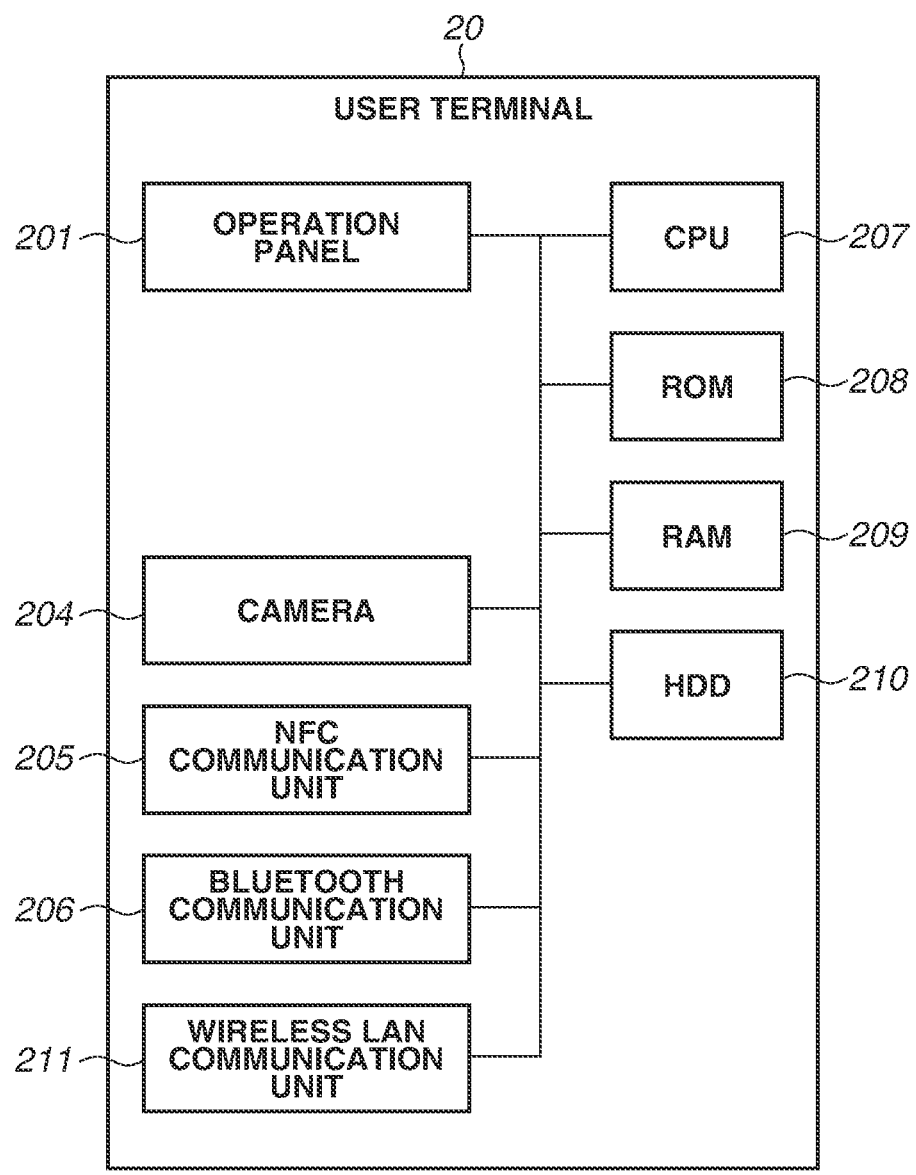
FIG. 3 is a diagram illustrating an example of a hardware configuration of a user terminal.

FIG. 3 is a diagram illustrating an example of a hardware configuration of the user terminal 20. As described above, the user terminal 20 according to the present exemplary embodiment is assumed to be an apparatus such as a smartphone or a tablet personal computer (PC). However, this is not seen to be limiting. Any apparatus can be used as long as the apparatus is an information processing apparatus that can connect to the network 100 using Wi-Fi® communication or the like.

A CPU 207 reads control programs stored in a ROM 208 and executes various processes for controlling the operation of the user terminal 20. The ROM 208 stores the control programs. A RAM 209 is a main memory and is used as a temporary storage area such as a work area for the CPU 207. An HDD 210 stores various pieces of data, such as images and/or electronic documents.

An operation panel 201 has a touch panel function that detects a touch operation of the user and displays various screens provided by an operating system (OS) and an electronic mail transmission application. The operation panel 201 is used to confirm information stored in the message application server 30. The user inputs a touch operation to the operation panel 201 to input a desired operation instruction to the user terminal 20. The user terminal 20 also includes a hardware key (not illustrated) that the user can use to input an operation instruction to the user terminal 20.

A camera 204 captures an image in response to an image capturing instruction from the user. The captured image is stored in a predetermined area of the HDD 210. The camera 204 can also be used to take an image of a QR Code® to enable the user terminal 20 to access information associated with the QR Code®.

The user terminal 20 can transmit and receive data to and from various peripheral devices via a near-field communication (NFC) communication unit 205, a Bluetooth® communication unit 206, and a wireless LAN communication unit 211. The Bluetooth® communication unit 206 of the user terminal 20 can be compatible with Bluetooth® Low Energy.

Figure 4:
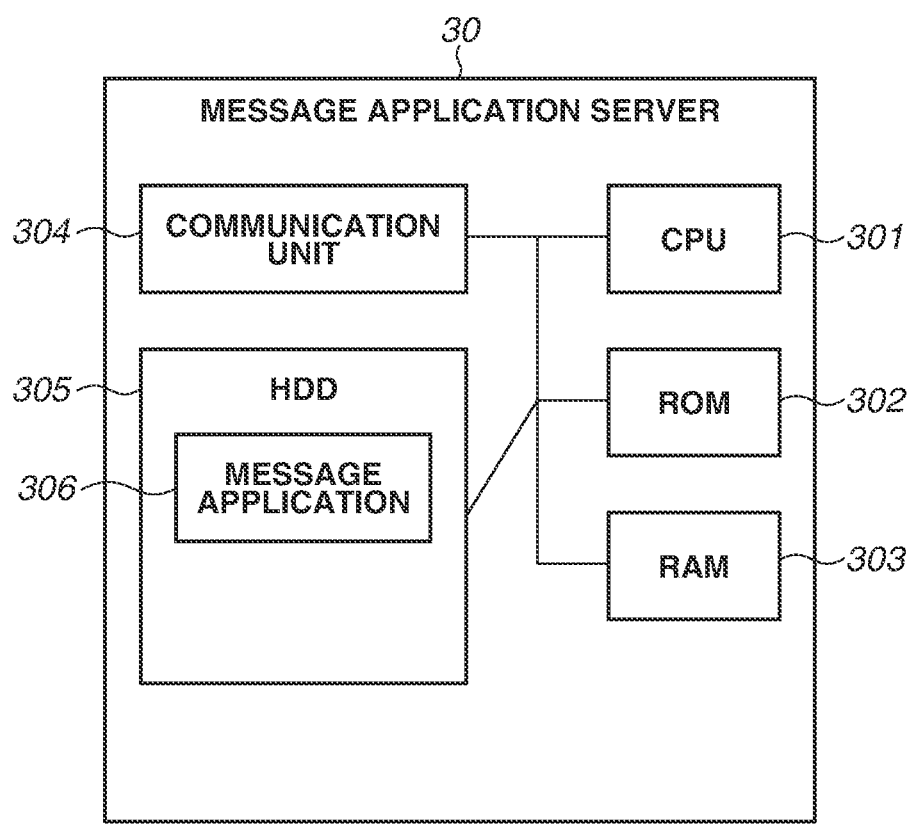
FIG. 4 is a diagram illustrating an example of a hardware configuration of a message application server.

FIG. 4 is a diagram illustrating an example of a hardware configuration of the message application server 30. A CPU 301 reads control programs stored in a ROM 302 and the message application 306 stored in an HDD 305, and executes various processes for controlling operation of the message application server 30.

The ROM 302 stores the control programs. A RAM 303 is a main memory and is used as a temporary storage area such as a work area for the CPU 301. The HDD 305 stores various pieces of data associated with a message, an image, channel information, and an application. The HDD 305 can transmit and receive data to and from various devices, such as the user terminal 20 and the MFP A 10 via a communication unit 304. The communication unit 304 can perform wired communication using Ethernet® or wireless communication using Wi-Fi®. The message application 306 is installed on the HDD 305 and is executed by the CPU 301.

Figure 5:
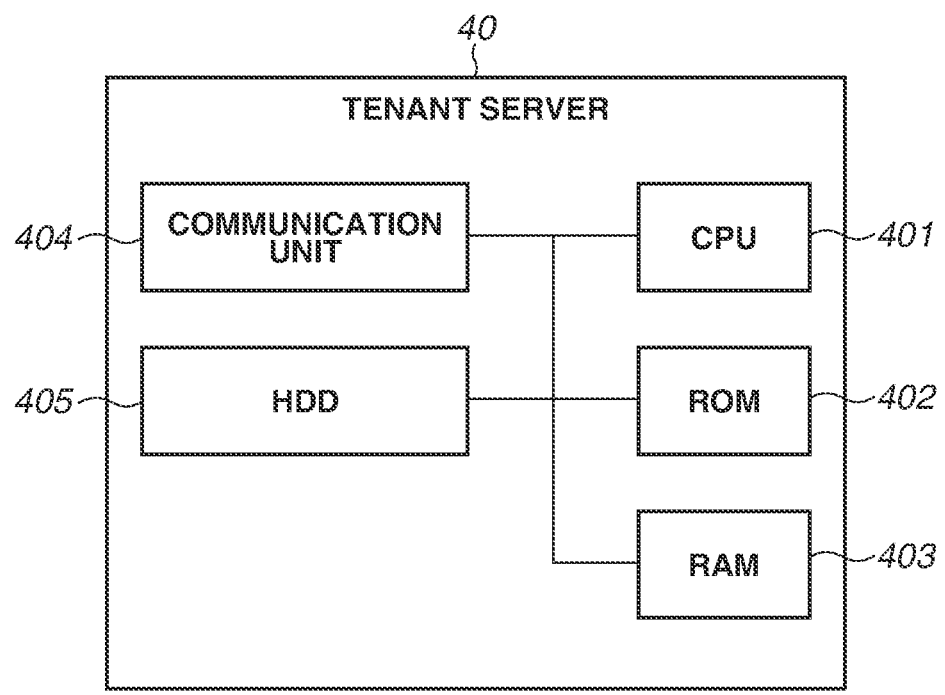
FIG. 5 is a diagram illustrating an example of a hardware configuration of a tenant server.

FIG. 5 is a diagram illustrating an example of a hardware configuration of the tenant server 40. A CPU 401 reads control programs stored in a ROM 402 and executes various processes for controlling tenant information 601. The tenant information 601 to be saved will be described below with respect to FIG. 6. The ROM 402 stores the control programs. A RAM 403 is a main memory and is used as a temporary storage area, such as a work area for the CPU 401. An HDD 405 stores the tenant information 601. The HDD 405 can transmit and receive data to and from devices such as the message application server 30 via a communication unit 404.

Figure 6:
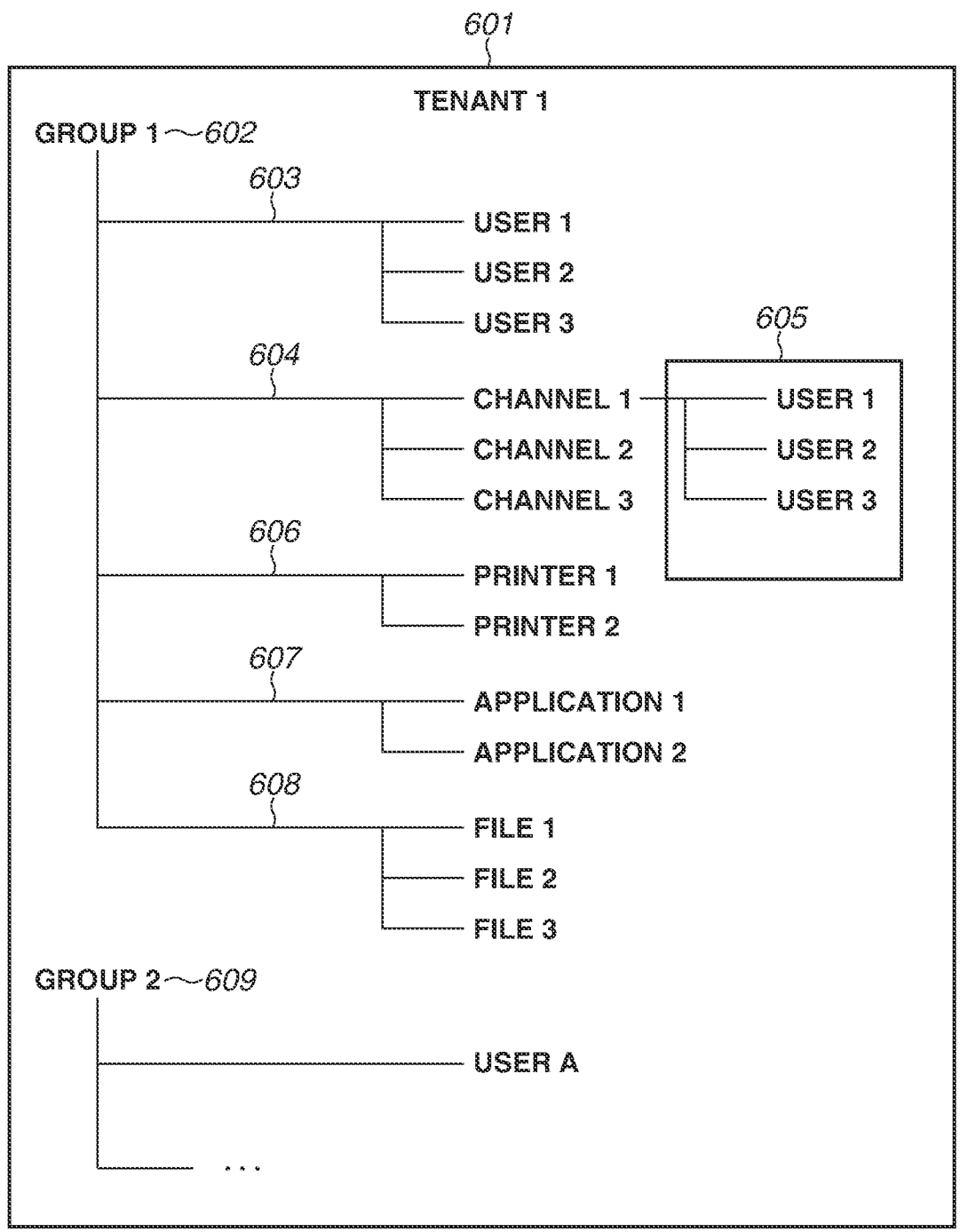
FIG. 6 is a diagram illustrating an example of tenant information stored in a hard disk drive (HDD) in the tenant server.

FIG. 6 is a diagram illustrating an example of the tenant information 601 stored in the HDD 405 in the tenant server 40. The tenant information 601 can include one or more groups. For description purposes, in the example of FIG. 6, two groups 602 and 609 are present. Depending on the configuration of the message application 306, there is a case where a single piece of tenant information has only a single piece of group information. In this case, the tenant information 601 is equivalent to the group information.

Both groups 602 and 609 have pieces of information constituting the group. For example, the group 602 has user information 603, channel information 604, printer information 606, cooperative application information 607, and file information 608.

The user information 603 indicates information regarding each user belonging to the group 602. The channel information 604 is information for grouping the user information 603 and includes a list 605 obtained by putting together pieces of user information corresponding to each channel.

The printer information 606 is information for identifying, for example, an MFP. An application that uses the group 602 references the printer information 606 and can send various commands to any MFP. The printer information 606 can be an Internet Protocol (IP) address or a media access control (MAC) address of the MFP, or can be an identifier (ID) that uniquely identifies the MFP. The ID can be an ID issued by the MFP A 10 when information regarding the MFP A 10 is registered in the message application server 30. An application that uses the group 602 references the printer information 606 and can send a command, such as a print command, to any MFP.

The printer information 606 is associated with the group 602. In another exemplary embodiment, the printer information 606 can be associated with each channel or can be associated with the cooperative application information 607, which is described below. For example, a configuration can be implemented where an MFP 1 (not illustrated) is associated with an application 1 (not illustrated), and the MFP 1 and an MFP 2 (not illustrated) are associated with an application 2 (not illustrated). The printer information 606 can be associated with the tenant information 601. In other words, in the case of a tenant 1 in FIG. 6, printers indicated by the printer information 606 associated with the tenant 1 are used.

The cooperative application information 607 is information for identifying a cooperative application that cooperates with the message application 306 corresponding to the group 602. The file information 608 is information regarding a file stored in association with the group 602.

For example, the file information 608 is transmitted to the MFP A 10, whereby the MFP A 10 can print the file. The file information 608 is associated with the group 602, but can be associated with each channel. For example, a certain user posts a file to a channel 1 that is a talk room, where the file posted to the channel 1 is stored in association with the file information 608. The user can confirm the stored file in the channel 1 or download the stored file to the user terminal 20.

In a case where the message application 306 references a list of users corresponding to the tenant information 601, the message application 306 references the group 602 stored in the HDD 405 of the tenant server 40 via the communication unit 304, and the user information 603 is listed. The same applies to the channel information 604, the printer information 606, the cooperative application information 607, and the file information 608.

Figure 7B:
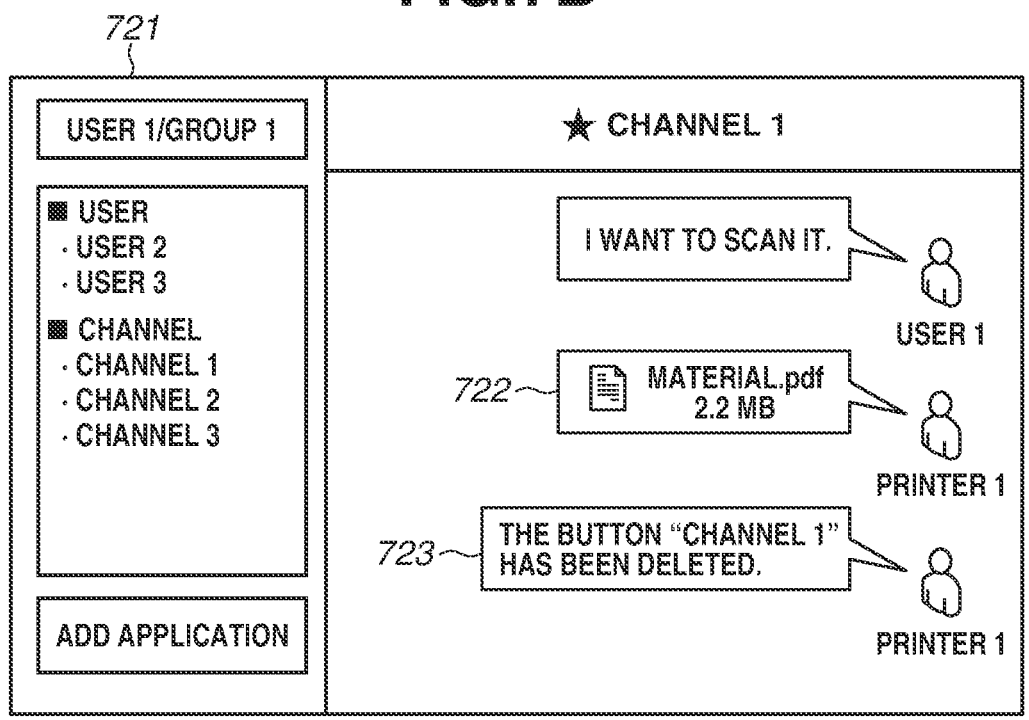

FIGS. 7A and 7B are diagrams illustrating examples of screens displayed on the operation panel 201 of the user terminal 20 by the message application 306. Screens 701, 711, and 721 are screens displayed on the operation panel 201 of the user terminal 20 by the user terminal 2 accessing the message application server 30.

The screen 701 is an example of a message screen displayed on the operation panel 201 of the user terminal 20 by the message application 306 corresponding to the group 602. The example of the message screen illustrates a case where a user indicated by the user information 603 accesses the message application 306 associated with the group 602.

A region 702 displays the user information 603 regarding the user accessing the message application server 30 and information indicating the group 602 to which the user belongs.

A region 703 displays the user information 603 regarding other users corresponding to the group 602 and the channel information 604. The user selects any partner in the region 703 and can then exchange messages with the selected partner. If the user selects the channel information 604 in the region 703, the user can exchange messages with all members belonging to each channel.

The screen 701 is a screen displayed in a case where the channel 1 is selected in the region 703.

A button 704 enables adding a cooperative application. When the button 704 is selected, the cooperative application is installed on the message application server 30. While a configuration is implemented where the cooperative application is installed in the present exemplary embodiment, a configuration can also be implemented where a list of other cooperative applications is displayed and the user can select a cooperative application to install.

A region 705 displays a history of messages received from a partner with whom the user is currently exchanging messages. More specifically, the region 705 displays the name of the partner or the talk room selected in the region 703.

A talk room 706 is a region that displays a message or a file posted by the user to the channel 1 that is a talk room.

A message 707 is a message for starting the cooperative application. The present exemplary embodiment is described using an example where a bot application is installed as the cooperative application. The bot application is triggered by posting a message "I want to scan it", and a screen 711 is then displayed. While the bot application is triggered using a message in the present exemplary embodiment, in another exemplary embodiment, the bot application can be triggered by the user selecting the bot application in the talk room 706.

The screen 711 is an example of a scan button generation screen displayed on the operation panel 201 of the user terminal 20 by the bot application.

A window 712 is a window for making reading settings (scan settings) for use in a reading process (a scan process) for reading a document and generating image data.

The reading size of a document can be set in a pull-down menu 713. Other reading settings, such as the file format, the density, and a two-sided setting, can be made in the window 712.

A pull-down menu 714 is a setting item for specifying an MFP that executes the reading process. The pull-down menu 714 displays, as a list, printer information corresponding to a channel or a group in which the bot application has been started in the tenant information 601. The pull-down menu 714 displays, as a list, printer information corresponding to the user having started the bot application. In this case, the MFP A 10 (a printer 1) is selected.

A setting field 715 is a setting field for setting the name of a button. The user can manually input text or select a name from channel names or the like. The button will be described below.

A setting field 716 is a setting field for specifying a deletion condition for the button. In the setting field 716, a condition for deleting (hiding) the button can be selected from among conditions of "delete based on lapse of time", "delete based on the number of times of execution", and "delete based on the number of buttons". If "delete based on lapse of time" is selected, the button set in the window 712 and registered in the MFP A 10 is deleted (hidden) after the lapse of a predetermined period from the registration of the button. The user can enter any time for the predetermined period. If "delete based on the number of times of execution" is selected, the button set in the window 712 and registered in the MFP A 10 is deleted (hidden) based on that the registered button has been selected the predetermined number of times since the registration of the button and the reading process has been executed the predetermined number of times. The user can enter any amount for the predetermined number of times. If "delete based on the number of buttons" is selected, the registered button is deleted (hidden) based on that the number of buttons registered in the MFP A 10 has reached a predetermined number. The user can enter any amount for the predetermined number.

A button 717 enables making a button registration request to the MFP A 10. If the button 717 is selected, information regarding the settings made in the window 712 and a request for registering the button are transmitted to the MFP A 10.

As described above, the button is deleted (hidden), making it is possible to adjust the number of buttons displayed on the operation unit 116 of the MFP A 10. This addresses difficulties that can occur for the user to select a button due to an increase in the number of buttons being displayed.

A button 718 enables a cancellation operation. If the button 718 is selected, the settings made in the window 712 are discarded, and the screen 711 returns to the screen 701.

A screen 721 is a screen displayed in a case where image data obtained by the reading process is transmitted from the MFP A 10 to the message application server 30 and uploaded to the channel 1.

A message 722 indicates a file (image data) transmitted from the MFP A 10 to the message application server 30 and uploaded to the channel 1.

A message 723 indicates a message transmitted from the MFP A 10 to the message application server 30 and posted to the channel 1. The message 723 is generated when the button 717 is selected and the button registered in the MFP A 10 is deleted (hidden) in a condition other than the condition set in the setting field 716. While the message is generated if the button is deleted (hidden) in a condition other than the set condition in the present exemplary embodiment, the message can always be generated if the button is deleted (hidden). The message 723 is a message indicating that the registered button has been deleted. Alternatively, the message 723 can be a message indicating that the registered button has been hidden.

Figure 8:
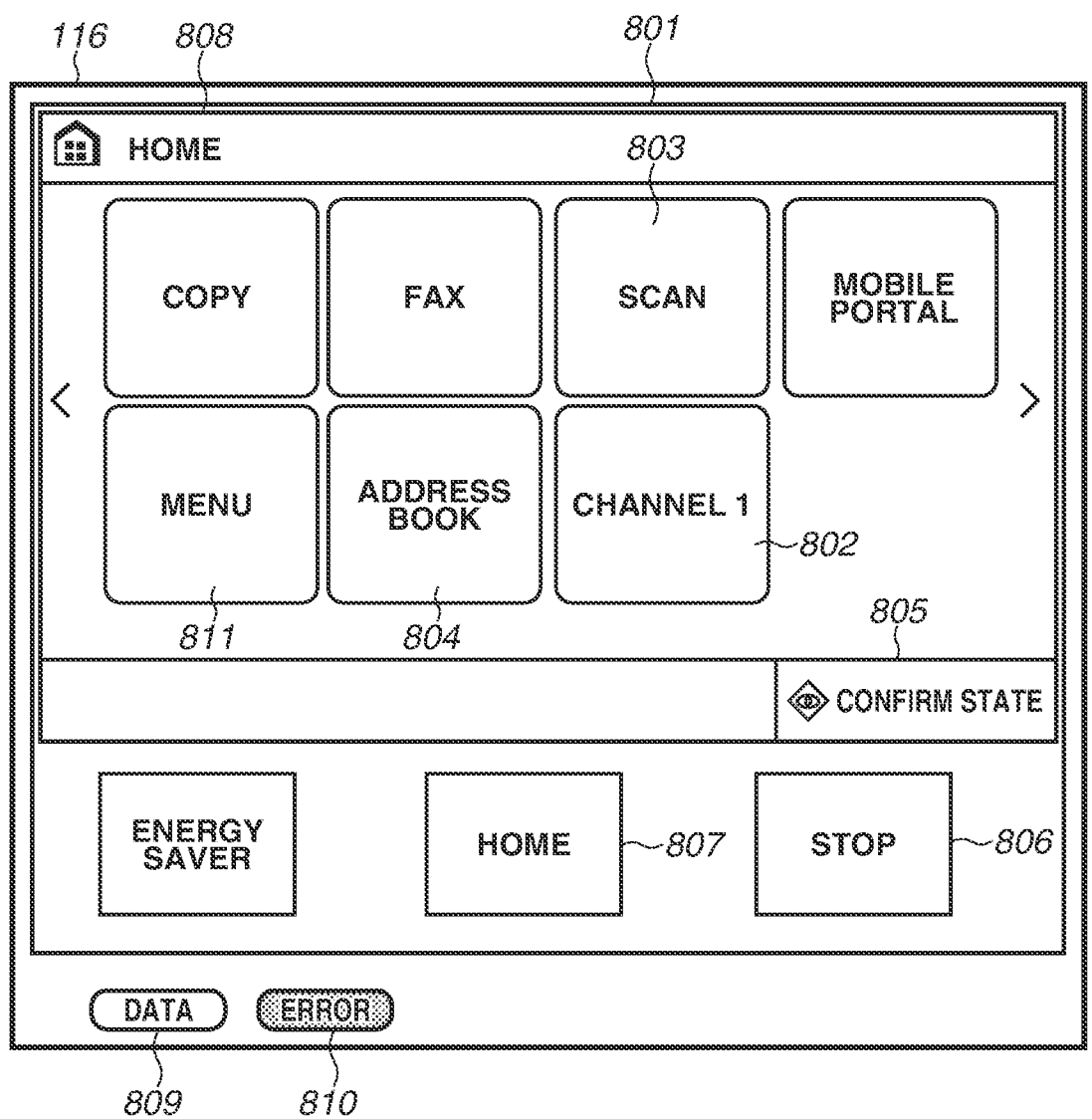
FIG. 8 is a diagram illustrating an example of a home screen displayed on an operation unit.

FIG. 8 is a diagram illustrating an example of a home screen 808 displayed on the operation unit 116. The operation unit 116 includes a touch panel 801 that displays an operation screen, a light-emitting diode (LED) 809, and an LED 810.

The touch panel 801 also functions as a receiving unit that, as a touch panel, receives an instruction from the user. The user directly touches a screen displayed on the touch panel 801 with the user's finger or an object such as a stylus, thereby providing an instruction to execute each function based on the displayed screen. The home screen 808 is an initial screen for providing an instruction to execute each function of the MFP A 10, and is a screen for selecting display of a screen for making various settings for each function, such as a copy, fax, scan, or medium print function, to be executed by the MFP A 10.

A "Confirm State" button 805 is a button for displaying a screen for confirming the state of the MFP A 10 (a state confirmation screen) (not illustrated). The state confirmation screen displays transmission history. While the "Confirm State" button 805 is described here as a button, a button on the touch panel is a demarcated region in a display area, and a touch on the demarcated region refers to a selection of the button.

A button 802 is a button for executing transmission to the channel 1 created by selection of the button 717. If the condition in the setting field 716 is satisfied, the button 802 is deleted. In other words, the button 802 is no longer displayed on the home screen 808. In addition, setting information stored in association with the button 802 is deleted.

A button 803 is a "Scan" button for displaying a scan selection screen (not illustrated) on the MFP A 10. The scan selection screen performs display for selection of a transmission method such as electronic mail transmission (e-mail), file transmission by Server Message Block (SMB), file transfer protocol (FTP), or Hypertext Transfer Protocol (HTTP), or Internet fax (iFax) transmission. A displayed selection display screen is touched, thereby each transmission setting screen is displayed.

A button 804 is an "Address Book" button for displaying an address book screen (not illustrated) of the MFP A 10.

The LEDs 809 and 810 are LEDs that notify the user of the state of the MFP A 10.

The LED 809 lights up during reception or execution of an electronic mail or a print job. The LED 810 lights up in a case where an error occurs in the MFP A 10.

A button 806 is a "Stop" button that, when selected, results in cancellation of various operations and is a resident key always displayed on the operation unit 116.

A button 807 is a "Home" button that, when selected, results in displaying the home screen 808 and is a resident key always displayed on the operation unit 116.

A button 811 is a "Menu" button for displaying a screen (not illustrated) for making an environment setting such as a use language, and setting each function.

Figure 9:
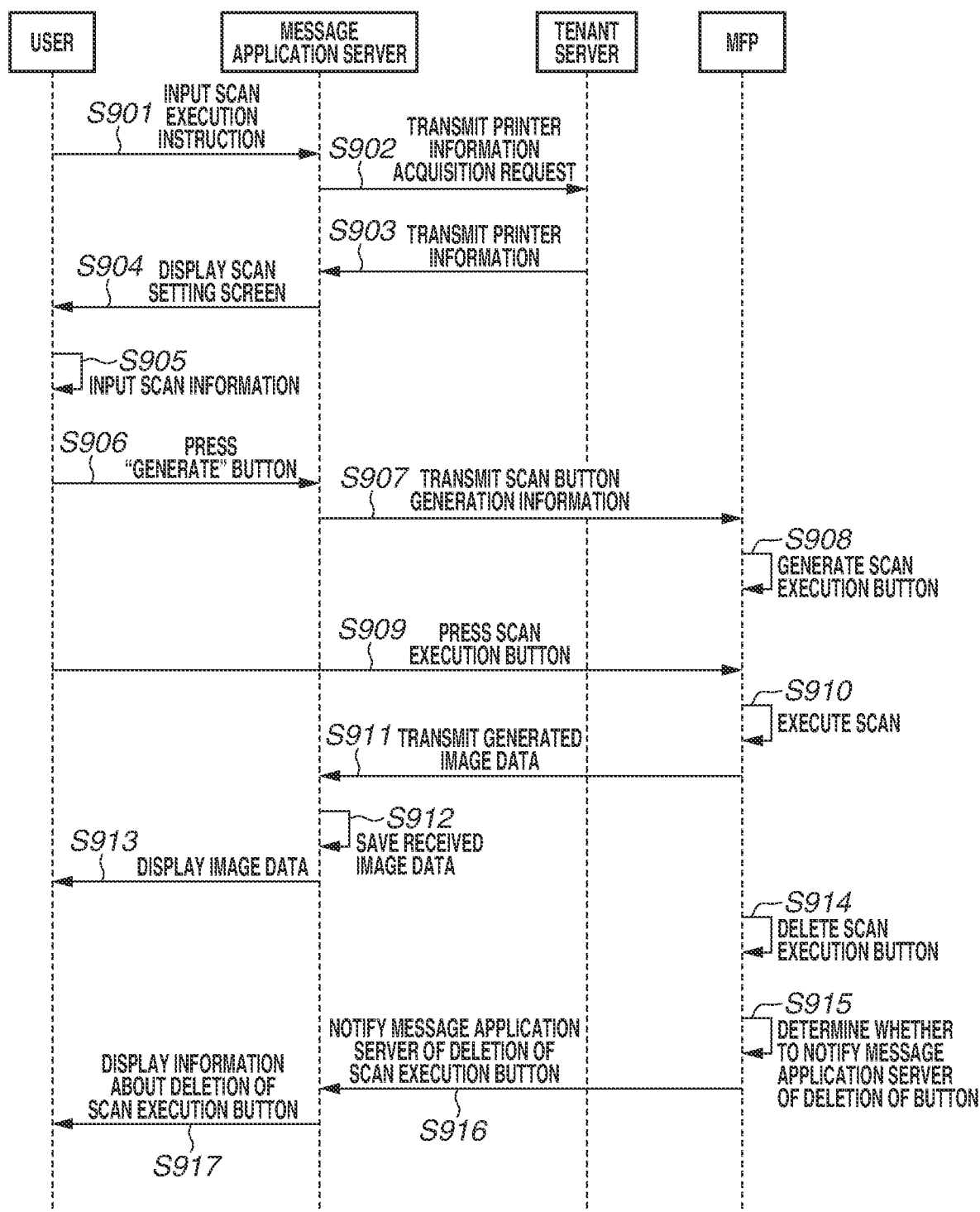
FIG. 9 is a sequence diagram illustrating examples of a scan process and a button deletion process by the MFP.

FIG. 9 is a sequence diagram illustrating examples of a scan process and a button deletion process by the MFP A 10. The operations (steps) of the MFP A 10 in the sequence diagram according to the present exemplary embodiment are executed by the CPU 111 loading a control program stored in the ROM 112 or the storage 114 into the RAM 113.

In step S901, the user inputs a scan execution instruction as in the message 707 in FIG. 7, and the CPU 301 of the message application server 30 receives input of the message 707.

In step S902, the message application server 30 executes the cooperative application, thereby transmitting a printer information acquisition request to the tenant server 40.

In step S903, the CPU 401 of the tenant server 40 transmits the printer information 606.

The transmitted printer information 606 can be printer information associated with the user having input the scan execution instruction, or can be printer information corresponding to a talk room (a channel) to which the scan execution instruction has been input.

In step S904, the message application server 30 executes the cooperative application, thereby displaying the window 712 on a chat screen as in the screen 711 in FIG. 7. Setting items displayed in the window 712 are provided by the cooperative application. While the setting items are provided by the cooperative application in the present exemplary embodiment, settable items and setting values can be acquired from the MFP A 10 using the printer information 606.

In step S905, the user sets the items displayed in the window 712. In step S906, the user selects the button 717.

In step S907, the message application server 30 executes the cooperative application, thereby generating scan button generation information based on the setting values input in step S905. Then, the message application server 30 transmits the scan button generation information to the MFP A 10. At this time, the cooperative application creates image transmission destination information 1002 regarding the channel in which the "Generate" button 717 has been selected, chat transmission destination information 1003, and mention information 1004 regarding the user having selected the "Generate" button 717. Then, the cooperative application adds the created information to the scan button generation information. The image transmission destination information 1002, the chat transmission destination information 1003, and the mention information 1004 will be described below.

The scan button generation information includes a transmission destination Uniform Resource Locator (URL) of an image and a message transmission URL. The message transmission URL can be the channel to which the scan execution instruction (a scan button generation instruction) has been input. Alternatively, the scan execution instruction (the scan button generation instruction) provided by the user can be set as a transmission destination. The mention information 1004 can also be added.

In step S908, the CPU 111 of the MFP A 10 generates the button 802 based on the received scan button generation information and displays the button 802 on the home screen 808. The storage 114 stores information as illustrated in FIG. 10 in association with the button 802.

In step S909, the user selects the button 802 via the operation unit 116 of the MFP A 10.

In step S910, based on the selection of the button 802, the CPU 111 of the MFP A 10 reads an image of a document and generates image data. In this step, the reading of the image of the document and the generation of the image data are executed based on reading settings registered in association with the button 802. In the example of FIG. 10, the image is read with the reading size A4 and the file format of the image data is Portable Document Format (PDF).

In step S911, the CPU 111 of the MFP A 10 transmits the generated image data (file) to the cooperative application of the message application server 30.

In step S912, the message application server 30 executes the cooperative application, thereby saving the received image data in the HDD 305. While the image is saved in the message application server 30 in the present exemplary embodiment, in another exemplary embodiment, the message application server 30 can save the image in a storage server with which the message application server 30 cooperates.

In step S913, the message application server 30 executes the cooperative application, thereby displaying, on the chat screen, the message 722 including a link for displaying the received image data. The message 722 can include the image data instead of the link to the image data.

In step S914, the CPU 111 of the MFP A 10 executes the deletion of the button 802. The deletion of the button 802 is executed based on the set deletion condition, the execution of the deletion by the user, or the upper limit of the number of buttons (not illustrated) that can be set in the MFP A 10. In the sequence in FIG. 9, the deletion of the button 802 is executed after the scan is executed. This is not seen to be limiting. In another exemplary embodiment, for example, after the button 802 is generated and displayed on the home screen 808, the button 802 may not be selected once and can be deleted and hidden on the home screen 808.

In step S915, the CPU 111 of the MFP 10 A determines whether to notify the message application server 30 that the deletion of the button 802 has been executed. The content of the determination will be described with reference to FIG. 11.

In step S916, the CPU 111 of the MFP A 10 notifies the bot application of the message application server 30 that the deletion of the button 802 has been executed. The message in this step can notify the bot application that the button 802 is hidden, or that scan setting information corresponding to the button 802 is deleted.

In step S917, the message application server 30 executes the cooperative application, thereby posting the message 723, which the message application server 30 has been notified of in step S916, to the chat screen as in the screen 721 for the user. Then, the message 723 is displayed on the chat screen. The talk room (the channel) to which the message 723 is posted is a talk room specified by the chat transmission destination information 1003 in FIG. 10, i.e., the talk room to which the scan execution instruction (the scan button generation instruction or the input of the scan settings) has been provided.

FIG. 10 is a diagram illustrating an example of information registered in association with the button 802. Button registration information in FIG. 10 is information received from the message application server 30 and stored in the storage 114 by the MFP A 10.

A button name 1001 is information indicating the name of a button to be displayed. In the case of the button 802, the name "Channel 1" is set, and therefore, the button name "Channel 1" is displayed when the button 802 is displayed on the home screen 808.

The image transmission destination information 1002 is information regarding a destination to which image data generated by selecting the displayed button is to be transmitted. The user can set the image transmission destination information 1002 in the window 712, or the image transmission destination information 1002 can be a destination determined in advance. The destination determined in advance can be information regarding the talk room to which the scan execution instruction (the scan button generation instruction) has been input by the user, or can be information regarding a folder corresponding to the talk room to which the scan execution instruction (the scan button generation instruction) has been input.

The chat transmission destination information 1003 is information for specifying a talk room to which the notification is to be transmitted when the button is deleted (the button is hidden). The user can specify the chat transmission destination information 1003 in the window 712, or the image transmission destination information 1002 can be determined in advance. In a case where the chat transmission destination information 1003 is determined in advance, the chat transmission destination information 1003 is determined as the talk room to which the scan execution instruction (the scan button generation instruction) has been input by the user.

The chat transmission destination information 1003 is also information regarding a notification destination to which a notification of the deletion of the button is to be provided, and is also a notification destination to which a notification that image data has been uploaded (step S913) by selection of the button 802 is to be provided. The chat transmission destination information 1003 can be a personal chat room of the user having input the scan execution instruction (the scan button generation instruction). The personal chat room is a talk room where the user chats on a one-to-one basis.

Mention information 1004 is mention information to be added to a chat when the chat is transmitted. The mention information 1004 is transmitted in addition to a chat to be transmitted using the chat transmission destination information 1003, enabling a notification to be provided to a particular user in a group. In other words, it is possible to select a user to be notified of a message indicating that image data has been uploaded, or a message indicating that the button 802 has been deleted.

A deletion condition 1005 is information indicating a condition for deleting (hiding) the button 802. The deletion condition 1005 is the content set in the setting field 716 of the window 712. When the deletion condition 1005 is satisfied, the button registration information in FIG. 10 can be deleted. In other words, the storage 114 does not store the button registration information.

A reading size 1006 is information indicating the size of a document to be read by the scanner. In addition, other settings regarding scanning such as the file format are also saved.

Figure 11:
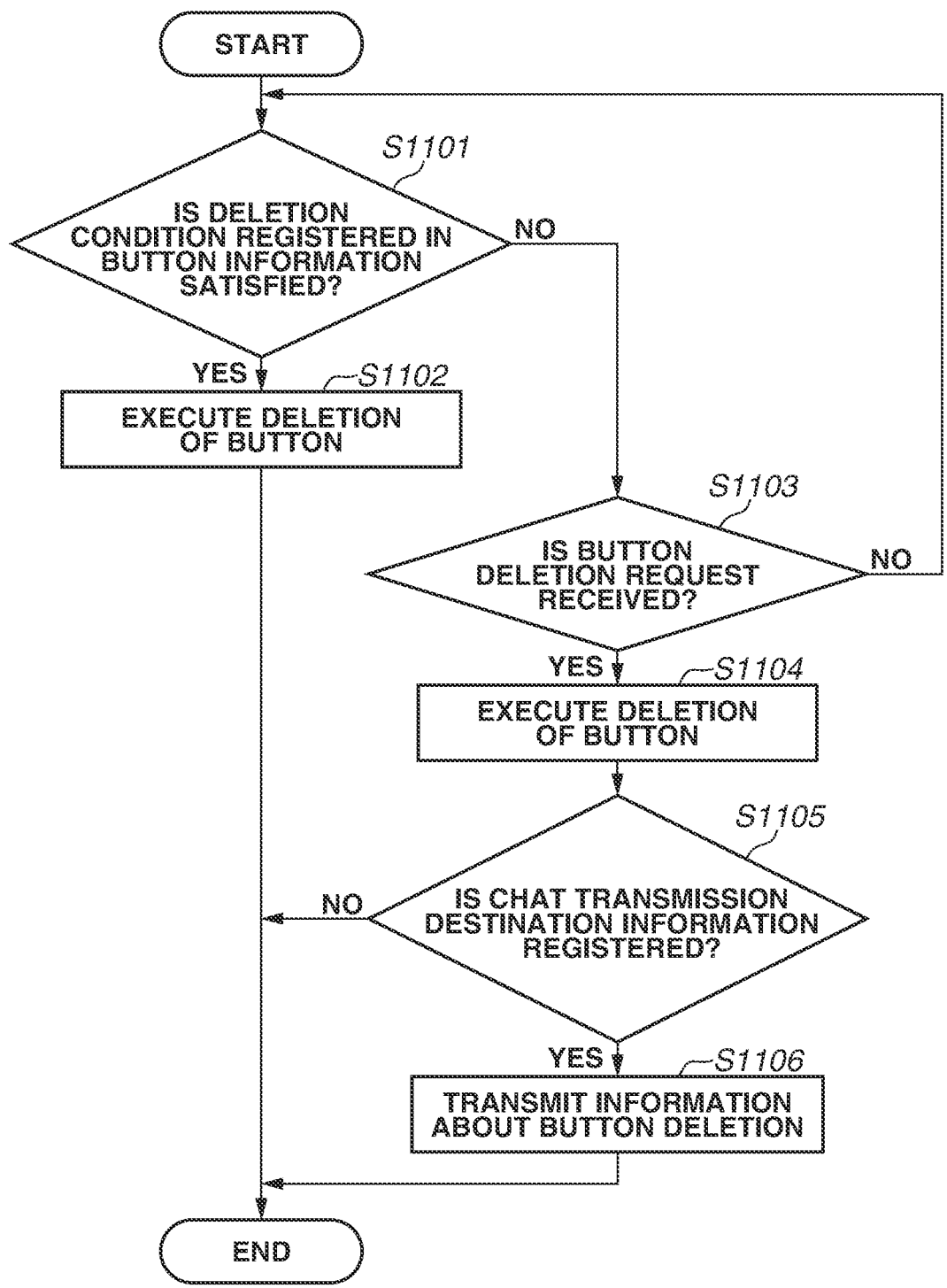
FIG. 11 is a flowchart illustrating an example of the button deletion process by the MFP.

FIG. 11 is a flowchart illustrating an example of the button deletion process by the MFP A 10. The operations (steps) in the flowchart according to the present exemplary embodiment are executed by the CPU 111 loading a control program stored in the ROM 112 or the storage 114 into the RAM 113. The procedure in FIG. 11 is started when a button is generated by a button generation instruction from the cooperative application of the message application server 30.

In step S1101, the CPU 111 of the MFP A 10 determines whether the deletion condition 1005, which is a predetermined condition registered in the button registration information regarding the generated button, is satisfied. If it is determined that the deletion condition 1005 is satisfied (YES in step S1101), the processing proceeds to step S1102. If it is determined that the deletion condition 1005 is not satisfied (NO in step S1101), the processing proceeds to step S1103. For example, in a case where the user sets the number of times of execution as the deletion condition 1005 in the window 712, if the number of times the reading process is executed by the button being selected reaches the number of times specified by the user, the deletion of the button is executed. In a case where the user sets a lapse of time as the deletion condition 1005 in the window 712, time that has elapsed since the generation of the button is measured. Then, if a period of time specified by the user elapses, the deletion of the button is executed. In a case where the user sets an execution instruction as the deletion condition 1005 in the window 712, if a deletion execution instruction is received from a chat server, the deletion of the button is executed.

In step S1102, the CPU 111 of the MFP A 10 executes the deletion of the button, and the processing ends. More specifically, the generated button 802 can be hidden on the home screen, or the button 802 can be displayed but may not be responding, e.g., may be grayed out, even if the button 802 is selected.

In step S1103, the CPU 111 of the MFP A 10 determines whether a button deletion request is received.

If the deletion request is issued due to the execution of the deletion by the user or the upper limit of the number of buttons in the apparatus managed separately from the number of buttons that can be set by the user is met, the determination in step S1103 is YES. If the determination is YES, the processing proceeds to step S1104. If the determination is NO, the processing returns to step S1101.

In step S1104, the CPU 111 of the MFP A 10 executes the deletion of the button. Specifically, the generated button 802 can be hidden on the home screen, or the button 802 can be displayed but may not be responding, e.g., may be grayed out, even if the button 802 is selected.

In step S1105, the CPU 111 of the MFP A 10 confirms whether the chat transmission destination information 1003 is registered in the button registration information. If the chat transmission destination information 1003 is registered therein (YES in step S1105), the processing proceeds to step S1106. If the chat transmission destination information 1003 is not registered (NO in step S1105), the processing ends.

In step S1106, if the mention information 1004 is registered in the registered chat transmission destination information 1003, the CPU 111 of the MFP A 10 adds the mention information 1004. Then, the CPU 111 of the MFP A 10 notifies the cooperative application of the message application server 30 of information indicating that the button has been deleted. The cooperative application is notified of the information, whereby the information is posted to a channel (a talk room) to which the button generation instruction has been provided, as in the screen 721. As described above, based on the deletion (the hiding) of the button, the notification is transmitted to the message application server 30.

According to the above-described processing, in a case where a button corresponding to a setting value received from a chat server and registered is displayed, a user's ease of selecting a desired button is improved.

The user is notified that a button is deleted, enabling the user to notice that the button has been deleted before the user operates the operation unit 116 of the MFP A 10. In other words, before operating the operation unit 116 of the MFP A 10, the user can know that the button is deleted.

In the above-described example, if the button is deleted even though the deletion condition for the button is not satisfied, the chat transmission destination is notified of the information indicating that the button has been deleted. This example is not seen to be limiting. In another exemplary embodiment, for example, regardless of whether the determination is YES or NO in step S1101, if the button is deleted, the chat transmission destination can be notified of the information indicating that the button is deleted.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described above, these embodiments are not seen to be limiting. The scope of the following claims is to be accorded the broadest interpretation so as to encompass all such modifications and equivalent structures and functions.

This application claims the benefit of Japanese Patent Application No. 2021-131092, filed Aug. 11, 2021, which is hereby incorporated by reference herein in its entirety.

What is claimed is:

1. A system comprising:
an information processing apparatus configured to provide a chat service; and
an image processing apparatus,
wherein the information processing apparatus includes:
a first processor that receives a scanning setting based on an instruction from a user in a channel of the chat service; and
a first network interface that transmits the received scanning setting to the image processing apparatus, and
wherein the image processing apparatus includes:
a display;
a scanner that scans an image of a document and generates image data;
a second network interface that receives the scanning setting transmitted from the first network interface; and
a second processor that registers an object associated with the scanning setting received by the second network interface;
wherein the second processor displays the registered object on the display before a predetermined period elapses from when the object is registered, and
wherein the second processor does not display the registered object on the display after the predetermined period elapses from when the object is registered.

2. An image processing apparatus that communicates with an information processing apparatus that provides a chat service, receives a scanning setting based on an instruction from a user in a channel of the chat service, and transmits the scanning setting, the image processing apparatus comprising:
a display;
a network interface that receives the scanning setting from the information processing apparatus; and
one or more processors that register an object associated with the scanning setting received by the network interface;
wherein the one or more processors display the registered object on the display before a predetermined period elapses from when the object is registered, and
wherein the one or more processors do not display the registered object on the display after the predetermined period elapses from when the object is registered.

3. The image processing apparatus according to claim 2, further comprising a storage that stores information corresponding to the object registered by the one or more processors,
wherein, based on an elapse of the predetermined period from when the object is registered, the one or more processors control the storage so as not to store the information corresponding to the object.

4. The image processing apparatus according to claim 2, wherein the network interface transmits based on the elapse of the predetermined period from when the object is registered, a notification indicating that the object has been deleted to the information processing apparatus.

5. The image processing apparatus according to claim 4, wherein, in a case where the one or more processors do not display the object on the display based on an instruction from the user, the network interface does not transmit the notification.

6. The image processing apparatus according to claim 4, wherein the network interface transmits the notification to the information processing apparatus so that the notification is posted to the channel in which the instruction is received.

7. The image processing apparatus according to claim 6, wherein the network interface receives information indicating the channel in which the scanning setting and the instruction are received from the information processing apparatus, and
wherein, based on the information indicating the channel received by the network interface, the network interface transmits the notification to the information processing apparatus so that the notification is posted to the channel in which the instruction is received.

8. The image processing apparatus according to claim 2, further comprising:
a scanner that scans a document to generate image data,
wherein, in a case where the object displayed by the display is selected, the scanner scans the document based on the scanning setting corresponding to the selected object and generates the image data, and then the network interface transmits the image data to the information processing apparatus.

9. The image processing apparatus according to claim 8, wherein the image data transmitted to the information processing apparatus in the case where the object displayed on the display is selected is posted to the channel.

10. A method for controlling an image processing apparatus that communicates with an information processing apparatus that provides a chat service, receives a scanning setting based on an instruction from a user in a channel of the chat service, transmits the scanning setting and includes a display, the control method comprising:
receiving the scanning setting from the information processing apparatus;
registering an object associated with the received scanning setting;
displaying the registered object on the display before a predetermined period elapses from when the object is registered; and
not displaying the registered object on the display after the predetermined period elapses from when the object is registered.

* * * * *